United States Patent [19]

Yamada et al.

[11] 4,041,051

[45] Aug. 9, 1977

[54] ANTHRAQUINONE DISPERSE DYESTUFFS

[75] Inventors: Eiji Yamada, Takatsuki; Hiroaki Ito, Toyonaka; Takashi Akamatsu, Ashiya, all of Japan

[73] Assignee: Sumitomo Chemical Company, Limited, Osaka, Japan

[21] Appl. No.: 569,586

[22] Filed: Aug. 2, 1966

[30] Foreign Application Priority Data

June 28, 1966 Japan .................................. 41-42537
Aug. 4, 1965 Japan .................................. 40-47371

[51] Int. Cl.$^2$ ...................... C07C 143/68; C09B 1/52

[52] U.S. Cl. ........................................ 260/373; 8/396; 260/371; 260/375

[58] Field of Search ................................ 260/373, 375

[56] References Cited

PUBLICATIONS

Perkin et al. II, J. Chem. Soc., 1929, 1399.
Perkin et al., J. Chem. Soc. 1928, p. 241.

*Primary Examiner*—Robert Gerstl
*Attorney, Agent, or Firm*—Stevens, Davis, Miller & Mosher

[57] ABSTRACT

1-Amino-4-hydroxy 2-p-alkoxy-benzenesulfonyloxy anthraquinone disperse dyestuffs have been prepared.

2 Claims, No Drawings

ANTHRAQUINONE DISPERSE DYESTUFFS

This invention relates to novel anthraquinone disperse dyestuffs, a process for producing the same and a process for dyeing synthesized shaped articles with the same with fastnesses.

More specifically, this invention relates to novel anthraquinone disperse dyestuffs represented by the following formula,

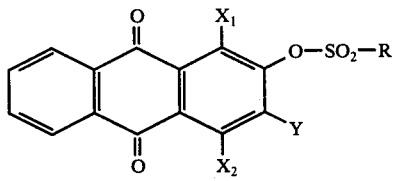

wherein $X_1$ means an amino radical, an alkylamino radical having 1 to 3 carbon atoms or a hydroxy radical, $X_2$ means a hydrogen atom or a hydroxy radical, Y means a hydrogen atom or a halogen atom and R means an aliphatic or an aromatic residue which is free from water-soluble radical.

It relates also to a process for producing the same and a process for dyeing synthesized shaped articles, especially fibers of aromatic polyester, with the same with fastnesses.

It is well known that, in this kind of disperse dyestuffs, improvement of the fastness to sublimation is usually accompanied by deterioration of the level-dyeing and build-up properties, because the fastness to sublimation is improved with decrease of affinity of dyestuffs for fiber articles.

So far, anthraquinone disperse dyestuffs introduced into the β-position thereof with a halogen atom, alkoxy radical, alkylmercapto radical, phenoxy radical, phenylmercapto radical, phenylradical, alkyl radical, carboxy radical or the like, are known but they are not always satisfactory for the accomplishment of all of the requirements on dyestuffs such as level-dyeing and build-up properties and fastness to sublimination.

While, the present invention have broadly studied the radical to be substituted into β-position, in order to find out novel anthraquinone disperse dyestuffs which meet all of the requirements such as level-dyeing and build-up properties, and which are employed for dyeing synthesized shaped articles, especially fibers, in clear shade with high fastnesses to light and sublimation.

Surprising is the finding that, by introducing an aliphatic or aromatic sulfonyloxy radical into β-position of a β-hydroxyanthraquinone useful disperse dyestuffs are obtained which are satisfactory in the level-dyeing and build-up properties, and which are employed for dyeing synthesized fiber articles in characteristic shade with fastness, especially fastness to sublimation.

Thus, one object of the present invention is to provide novel anthraquinone disperse dyestuffs which are more usefull for dyeing synthesized shaped articles, especially fibers, as compared with the known anthraquinone disperse dyestuffs. Another object of the present invention is to provide a process for producing the said disperse dyestuffs. Still another object of the present invention is to provide a process for dyeing synthesized shaped articles, such as fiber, ribbon, film, sheet and the like, with the above-mentioned dyestuffs. Other objects of the present invention will be apparent from the following description.

The present invention have found that these and other objects of the present invention can be accomplished by provision of novel anthraquinone dyestuffs represented by the following formula,

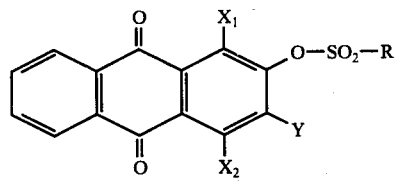

wherein $X_1$ means an amino radical, an alkylamino radical having 1 to 3 carbon atoms or a hydroxy radical, $X_2$ means a hydrogen atom or a hydroxy radical, Y means a hydrogen atom or a halogen atom and R means an aliphatic or an aromatic residue which is free from water-soluble radical, preferably an alkyl or alkenyl radical having 1 to 6 carbon atoms; an alkoxyalkyl radical having 3 to 6 carbon atoms; haloalkyl or haloalkenyl radical having 1 to 3 carbon atoms; cyclohexyl radical; aralkyl radical; phenyl radical substituted or not substituted with an alkyl radical, an alkoxy radical or an alkylmercapto radical respectively having 1 to 6 carbon atoms, nitro radical, phenylmercapto radical, benzenesulfonyloxy radical or a halogen atom; or naphthyl radical. In the present invention, a process for producing the same is also provided, which comprises contacting a β-hydroxyanthraquinone represented by the following formula,

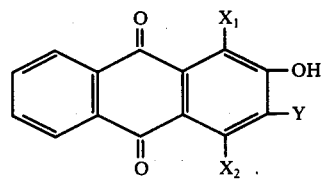

wherein $X_1$, $X_2$ and Y have the same meanings as defined above, with a sulfonyl halide represented by the following formula, $$R-SO_2-X \qquad III$$

wherein R has the same meanings as defined above and X means a halogen atom, in the presence of an acid binding agent, if necessary, the said reaction being controlled in an organic solvent. Furthermore, a process for dyeing synthesized shaped articles, especially aromatic polyester fiber articles, is provided which is characterized by contacting the synthesized shaped article with one or more of the novel anthraquinone disperse dyestuffs represented by the formula I.

A full understanding on the present invention can be given by referring to the following detailed illustration. As the β-hydroxyanthraquinone (II) employed in the present invention, 1-amino-2,4-dihydroxyanthraquinone, 1-methylamino-2,4-dihydroxyanthraquinone, 1-ethylamino-2,4-dihydroxyanthraquinone, 1,2,4-trihydroxyanthraquinone, 1,2,4-trihydroxy-3-chloroanthraquinone, 1,2,4-trihydroxy-3-bromoanthraquinone, 1,2-dihydroxyanthraquinone, 1-amino-2-hydroxyanthraquinone, and the like, are exemplified, but they are, of course, not to limit the scope of the present invention.

Sulfonyl halides (III) employed in the present invention are as follows, which are not to limit the scope of the present invention.

methanesulfonyl chloride
    methanesulfonyl bromide
    ethanesulfonyl chloride
    n-propanesulfonyl chloride
    n-butanesulfonyl chloride
    iso-pentanesulfonyl chloride
    allylsulfonyl chloride
    vinylsulfonyl chloride
    $\beta$-metallylsulfonyl chloride
    $\beta$-methoxyethanesulfonyl chloride
    $\beta$-ethoxyethanesulfonyl chloride
    $\beta$-butoxyethanesulfonyl chloride
    chloromethylsulfonyl chloride
    bromomethylsulfonyl chloride
    $\alpha$-chlorovinylsulfonyl chloride
    $\alpha$-chloroallylsulfonyl chloride
    cyclohexanesulfonyl chloride
    benzysulfonyl chloride
    benzenesulfonyl chloride
    benzenesulfonyl bromide
    p-methylbenzenesulfonyl chloride
    p-methylbenzenesulfonyl bromide
    p-ethylbenzenesulfonyl chloride
    p-iso-propylbenzenesulfonyl chloride
    o-methylbenzenesulfonyl chloride
    o-methylbenzenesulfonyl bromide
    2,4-dimethylbenzenesulfonyl chloride
    p-methoxybenzenesulfonyl chloride
    p-ethoxybenzenesulfonyl chloride
    p-n-propoxybenzenesulfonyl chloride
    p-n-butoxybenzenesulfonyl chloride
    4-methyl-3-methoxybenzenesulfonyl chloride
    4-methylmercaptobenzenesulfonyl chloride
    3-nitrobenzesulfonyl chloride
    3-nitro-4-methoxybenzenesulfonyl chloride
    p-phenoxybenzensulfonyl chloride
    p-phenylmercaptobenzenesulfonyl chloride
    p-benzenesulfonyloxybenzenesulfonyl chloride
    m-chlorobenzenesulfonyl chloride
    p-chlorobenzenesulfonyl chloride
    2,4-dichlorobenzenesulfonyl chloride
    p-bromobenzenesulfonyl chloride
    $\beta$-naphthalenesulfonyl chloride In carrying out the present invention, a mixture of 1 mol of the $\beta$-hydroxyanthraquinone (II) and not less than 1 mol of one or more members of the sulfonylhalides (III) is stirred, is necessary, in a neutral or weekly basic solvent or a mixture thereof, in the presence of an acid binding agent such as an alkali metal compound, an alkali earth metal compound and a tertially amine at a temperature of 0° to 80° C, preferably 5° to 50° C.

Hereon, solvents employed in this reaction are as follows: as neutral solvents, acetone, methyl ethyl ketone, methyl isobutyl ketone, ethyleneglycol, diethyleneglycol, ethyleneglycol monomethyl ether, ethyleneglycol monobutyl ether, diethyleneglycol dimethyl ether, ethyleneglycol monoacetate, chloroform, perchloroethylene, benzene, toluene, chlorobenzene, nitrobenzene, dioxane, dimethylformamide, dimethyl sulfoxide, methyl alcohol, ethyl alcohol or butyl alcohol and as weak basic solvents, pyridine, picoline, triethylamine, triethanolamine or dimethylaniline are exemplified.

While, when an alkyl or arylsulfonyl halide to be employed in this reaction is liquid and has a function as solvent, it is not always necessary to use other solvents mentioned above.

As acid binding agents, sodium or potassium bicarbonate or acetate, or sodium, potassium or calcium carbonate or hydroxide may be employed, besides a weekly basic solvent such as tertially amines, i.e. pyridine, picoline, triethylamine, triethanolamine or dimethylaniline may also be utilized. The present novel anthraquinone disperse dyestuffs represented by the formula I are applicable for dyeing various synthetic shaped articles, such as fiber, ribbon, film, sheet and the like, preferably hydrophobic fiber articles, especially aromatic polyester fiber articles.

More concretely speaking, at least one of the present dyestuffs, a dispersing agent and water are admixed and ground on a ball mill for a sufficient period of time, and the resulting mixture is subjected to spray drying, thereby to obtain a dyeing agent. An aromatic polyester fiber article may be treated in a dye bath containing the dyeing agent obtained above at a temperature of 110° to 130° C under pressure for 60 to 90 minutes. The thus-treated fiber article is rinsed with water, reductively rinsed and dried, thereby to obtain a dyed product in clear shade with exceedingly high fastnesss, especially fastnesses to light and sublimation. While, the said fiber article may be treated with the said dyeing agent according to the carrier dyeing or the thermosol dyeing method, or may be printed with a paste containing the said dyeing agent. Thus, a dyed product in clear shade may be also obtained having high fastnesses, especially fastnesses of light and sublimation. The present invention will be illustrated more concretely with reference to the following examples, which are given by way of illustration and not by way of limitation of the present invention. All parts and percentages are by weight.

EXAMPLE 1

A mixture of 5.1 parts of 1-amino-2,4-dihydroxyanthraquinone, 51 parts of ethyleneglycol monomethyl ether and 7.6 parts of p-methylbenzenesulfonyl chloride is adjusted to temperature of 15° C, and 6 parts of anhydrous sodium carbonate is gradually added thereto at a temperature of 15° to 20° C. The mixture is stirred for about 1 hour at the same level of temperature. After the reaction is over, the reaction mixture is filtered to separate crystals, which are washed with methyl alcohol and hot water and dried. Thus, 6.5 parts of a novel dyestuff represented by the following formula,

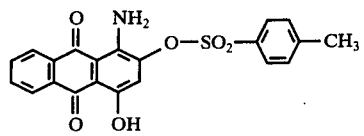

is obtained.

Melting point and elementary analysis value of the dyestuff which has been recrystallized from ethleneglycol monomethyl ether are as follows:

Melting point 208°–210° C

| Elementary analysis: | O% | H% | N% | S% |
|---|---|---|---|---|
| Calculated (as $C_{21}H_{15}NO_6S$) | 61.6 | 3.69 | 3.42 | 7.82 |
| Found | 61.5 | 3.96 | 3.23 | 7.95 |

The thus-obtained dyestuff may be employed for dyeing aromatic polyester fiber articles to bluish red shade with fastnesses, especially fastnesses to sublimation and light.

EXAMPLE 2

A mixture of 5.1 parts of 1-amino-2,4-dihydroxyanthraquinone, 51 parts of ethyleneglycol monomethyl ether and 7.0 parts of benzenesulfonyl chloride is cooled to temperature of 8° C, and 6 parts of anhydrous sodium carbonate is gradually added thereto, whereby the temperature gradually rises up to 11° C because of mild exothermic reaction. The mixture is stirred for about 1 hour at a temperature of 8° to 11° C. After the reaction is over, the reaction mixture is filtered to separate crystals, which are washed with methyl alcohol and water and dried.

Thus, 7.1 parts of an analytically pure novel anthraquinone disperse dyestuff represented by the following formula,

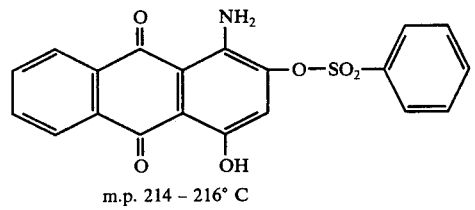

m.p. 214 – 216° C is obtained.

The thus-obtained dyestuff may be employed for dyeing aromatic polyester fiber articles in bluish red shade with fastness, especially fastness to sublimation.

EXAMPLE 3

A mixture of 5.1 parts of 1-amino-2,4-dihydroxyanthraquinone, 51 parts of acetone and 4.5 parts of p-ethoxybenzenesulfonyl choride is treated with 10 parts of pyridine and 5 parts of anhydrous sodium carbonate according to the same way as in Example 2, thereby to obtain a novel dyestuff represented by the following formula,

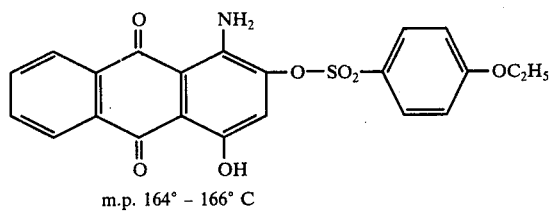

m.p. 164° – 166° C which may be employed for dyeing aromatic polyester fiber articles in bluish red shade with fastness to sublimation.

EXAMPLE 4

A mixture of 5.1 parts of 1-amino-2,4-dihydroxy-anthraquinone, 15.3 parts of ethyleneglycol monomethyl ether and 4.4 parts of p-ethylbenzenesulfonyl chloride is treated with 4 parts of anhydrous sodium carbonate according to the same way as in Example 2, thereby to obtain a novel dyestuff represented by the following formula,

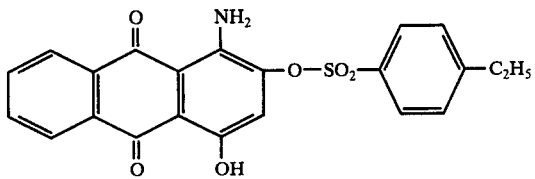

which may be employed for dyeing aromatic polyester fiber articles in bluish red shade with fastness to sublimation.

EXAMPLE 5

A mixture of 5.1 parts of 1-amino-2,4-dihydroxyanthraquinone, 15.3 parts of ethyleneglycol monomethyl ether and 6.3 parts of p-chlorobenzenesulfonyl chloride is treated with 4 parts of anhydrous sodium carbonate according to the same way as in Example 1, thereby to obtain a novel dyestuff represented by the following formula,

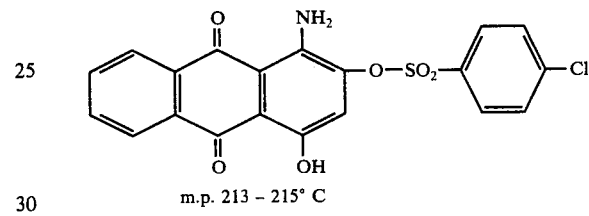

m.p. 213 – 215° C which may be employed for dyeing aromatic polyester fiber articles in bluish red shade with fastness to sublimation.

EXAMPLE 6

To 30 parts of acetone, 5.1 parts of 1-amino-2,4-dihydroxyanthraquinone and 6.3 parts of 3-nitro-4-methoxybenzenesulfonyl chloride are added and the mixture is added with 10 parts of pyridine at a temperature of 5° to 15° C while being stirred.

Successively, the reaction mixture is stirred for 30 minutes, thereby to produce crystals, which are separated by filtration, washed and dried.

The thus-obtained novel dyestuff represented by the following formula,

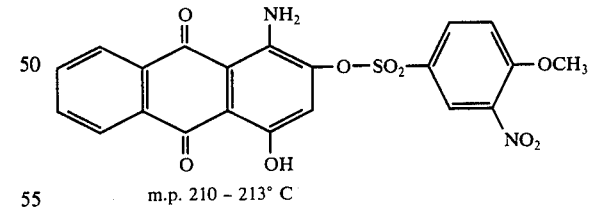

m.p. 210 – 213° C (from ethyleneglycol monomethyl ether) may be employed for dyeing aromatic polyester fiber articles in bluish red shade with fastness to sublimation.

EXAMPLE 7

A mixture of 5.1 parts of 1-amino-2,4-dihydroxy-anthraquinione, 51 parts of acetone and 4.3 parts of p-methoxybenzensulfonyl chloride is treated with 10 parts of pyridine and 3 parts of anhydrous sodium carbonate according to the same way as in Example 1, thereby to obtain a novel dyestuff represented by the following formula,

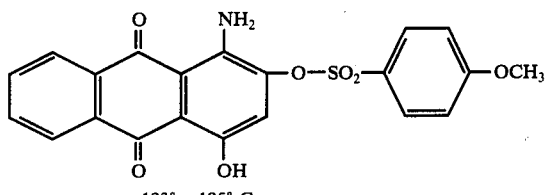

m.p. 193° – 195° C which may be employed for dyeing aromatic polyester fiber articles in bluish red shade with fastness to sublimation.

EXAMPLE 8

A mixture of 10 parts of 1,2,4-trihydroanyanthraquinone, 100 parts of ethyleneglycol monomethyl ether and 15 parts of p-methylbenzenesulfonyl chloride is treated with 12 parts of anhydrous sodium carbonate according to the same way as in Example 2, thereby to obtain a novel dyestuff represented by the following formula,

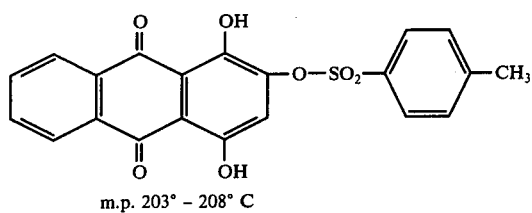

m.p. 203° – 208° C which may be employed for dyeing aromatic polyester fiber articles in orange shade with fastnesses to light and sublimation.

EXAMPLE 9

A mixture of 5.4 parts of 1-methylamino-2,4-dihydroxy-anthraquinone, 20 parts of chloroform, 20 parts of acetone and 5.1 parts of p-methoxybenzenesulfonyl chloride is treated with 10 parts of pyridine and 2.5 parts of anhydrous sodium carbonate according to the same way as in Example 2, thereby to obtain a novel dyestuff represented by the following formula,

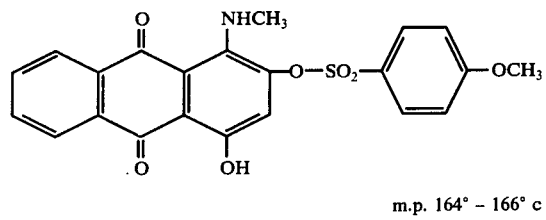

m.p. 164° – 166° c which may be employed for dyeing aromatic polyester fibers articles in violet shade with fastnesses to light and sublimation.

EXAMPLE 10

Five point one parts of 1-amino-2,4-dihydroxyanthraquinone, 51 parts of acetone and 6 parts of anhydrous sodium carbonate are mixed together at room temperature and the mixture is added dropwise with 3 parts of ethanesulfonyl chloride at temperature of 25° C.

The reaction mixture is stirred for 4 hours at the same level of temperaure, thereby to produce crystals, which are separated by filtration, washed and dried.

The thus obtained novel dyestuff represented by the following formula.

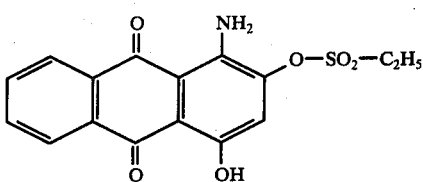

m.p. 168° – 170° C may be employed for dyeing polyester fiber articles in bluish red shade with fastness to light.

EXAMPLE 11

A mixture of 5.1 parts of 1-amino-2,4-dihydroxyanthraquinoe, 51 parts of acetone and 6 parts of anhydrous sodium carbonate is treated with 4.5 parts of β-ethoxyethanesulfonyl chloride according to the same way as in Example 10, thereby to obtain a novel dyestuff represented by the following formula,

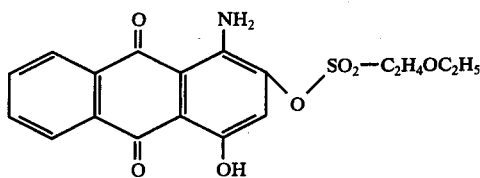

which may be employed for the same purposes in that of Example 10.

EXAMPLE 12

A mixture of 4.8 parts of 1,2-dihydroxyanthraquinone, 48 parts of ethylenglycol monomethyl ether, 7.6 parts of p-methylbenzenesulfonyl chloride and 5 parts of anhydrous sodium carbonate at temperature of 25° C is stirred for 2 hours at temperature of 25° to 30° C. Thereafter, the reaction mixture is heated up to temperature of 50° C and filtered to separate crystals, which are washed and dried.

The thus obtained novel dyestuff represented by the following formula,

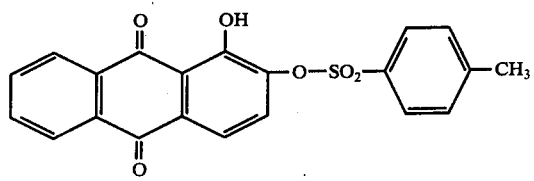

m.p. 211° – 214° C (from pyridine)

may be employed for dyeing polyester fiber articles in yellow shade with fastness to light.

EXAMPLE 13

Eleven point three parts of 1,2,4-trihydroxy-3-chloroanthraquinone, instead of 10 parts of 1,2,4-trihydroxyanthraquinone in Example 8, is treated according to the same way as in Example 2, thereby to obtain a novel dyestuff represented by the following formula,

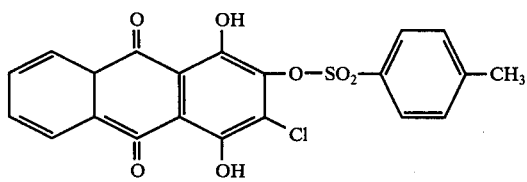

which may be employed for the similar purposes to that of Example 8.

EXAMPLE 14

Five point one parts of 1-amino-2,4-dihydroxyanthraquinone is treated using 10 parts of p-phenoxybenzenesulfonyl chloride, instead of 7.0 parts of benzenesulfonyl chloride in Example 2 according to the same way as in Example 2, thereby to obtain a novel dyestuff represented by the following formula,

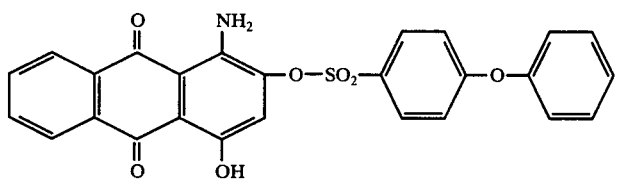

which may be employed for dyeing aromatic polyester fiber articles in bluish red shade with exceedingly high fastness to sublimation.

EXAMPLE 15

A mixture of 4 parts of the dyestuff obtained in Example 1, 6 parts of disodium dinaphthylmethandisulfonate and 20 parts of water is ground in a ball mill for a sufficient period of time. The resulting colloidal liquor is subjected to spray drying, thereby to obtain 10 parts of a dyeing agent.

Into a dye bath consisting of 1000 parts of water and 2 parts of the dyeing agent obtained above, 25 parts of polyester spun yarn is dipped, and the dyeing bath is gradually heated.

The temperature is kept at 130° C under pressure for 60 minutes.

Thereafter, the resulting yarn is washed with hot water, washed reductively and dried, thereby to obtain a dyed product in clear bluish red shade.

The thus-obtained dyed product is excellent in fastness, especially fastnesses to light and sublimation.

EXAMPLE 16

A mixture of 4 parts of the dyestuff obtained in Example 2, 6 parts of disodium dinaphthylmethanedisulfonate and 20 parts of water, is treated according to the same way as in Example 15, thereby to obtain 10 parts of a dyeing agent. Polyester cloth is printed with a paste prepared by mixing 5 parts of the dyeing agent obtained above with 30 parts of water and 65 parts of starch tragacanth and drying the mixture.

The printed material is successively heat-treated on an expander at temperature of 200° C for 2 minutes, washed with water and reductively washed, thereby to obtain a dyed product in bluish red shade with fastness.

EXAMPLE 17

A mixture of 4 parts of the dyestuff obtained in Example 3, 6 parts of disodium dinaphthylmenthanedisulfonate and 20 parts of water, is treated according to the same way as in Example 15, thereby to obtain 10 parts of a dyeing agent. Twenty parts of polyester spun yarn is treated in a dye bath prepared by mixing 1 parts of the dyeing agent obtained above with 1000 parts of water, 4 parts of o-phenylphenol and 2 parts of acetic acid, at temperature of 100° C for 90 minutes.

The resulting yarn is washed with hot water, reductively washed and dried, thereby to obtain a dyed product in bluish red shade with fastnesses.

According to the same way as in Examples 15 to 17, polyester fiber articles are dyed in various shades as shown in the following Table with fastnesses, using the present anthraquinone disperse dyestuffs, the formulae of which are also shown in the same table.

Table

| Example No. | Formula of the Dye | Shade |
|---|---|---|
| 18 | ![structure] | bluish red |
| 19 | ![structure] | bluish red |

Table-continued

| Example No. | Formula of the Dye | Shade |
|---|---|---|
| 20 | 1-amino-4-hydroxy-2-(4-(4-chlorophenoxy)phenylsulfonyloxy)-5,6,7,8-tetrahydroanthraquinone | bluish red |
| 21 | 1-amino-4-hydroxy-2-(n-butylsulfonyloxy)anthraquinone | bluish red |
| 22 | 1,4-dihydroxy-3-chloro-2-(2-ethoxyethylsulfonyloxy)anthraquinone | orange |
| 23 | 1,4-dihydroxy-2-(cyclohexylsulfonyloxy)anthraquinone | orange |
| 24 | 1-amino-4-hydroxy-2-(benzylsulfonyloxy)anthraquinone | bluish red |
| 25 | 1,4-dihydroxy-2-(4-n-butoxyphenylsulfonyloxy)anthraquinone | orange |
| 26 | 1-amino-4-hydroxy-2-(4-methylthiophenylsulfonyloxy)anthraquinone | bluish red |
| 27 | 1-amino-4-hydroxy-2-(4-phenylsulfonyloxyphenylsulfonyloxy)anthraquinone | bluish red |
| 28 | 1,4-dihydroxy-3-chloro-2-(4-ethylphenylsulfonyloxy)anthraquinone | orange |

Table-continued
| Example No. | Formula of the Dye | Shade |
|---|---|---|
| 29 | | orange |
| 30 | | violet |
| 31 | | violet |
| 32 | | orange |
| 33 | | yellow |
| 34 | | bluish red |
What we claim is:
1. A compound of the formula,
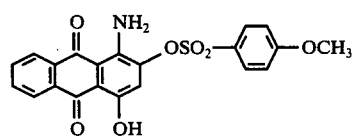
2. A compound of the formula,
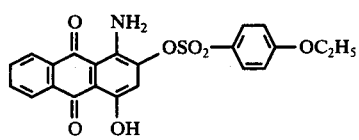
* * * * *